(12) United States Patent
Lee et al.

(10) Patent No.: US 7,027,122 B2
(45) Date of Patent: Apr. 11, 2006

(54) BONDING APPARATUS HAVING COMPENSATING SYSTEM FOR LIQUID CRYSTAL DISPLAY DEVICE AND METHOD FOR MANUFACTURING THE SAME

(75) Inventors: Sang Seok Lee, Taegu-kwangyokshi (KR); Sang Ho Park, Pusan-kwanyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/259,416

(22) Filed: Sep. 30, 2002

(65) Prior Publication Data

US 2003/0174274 A1    Sep. 18, 2003

(30) Foreign Application Priority Data

Mar. 12, 2002   (KR)   ............................... 2002-13191
Mar. 25, 2002   (KR)   ............................... 2002-15951

(51) Int. Cl.
G02F 1/1341   (2006.01)
G02F 1/13     (2006.01)
G02F 1/1339   (2006.01)

(52) U.S. Cl. ..................... 349/189; 349/187; 349/190
(58) Field of Classification Search ............... 349/187, 349/189, 190
See application file for complete search history.

(56) References Cited

U.S. PATENT DOCUMENTS

| | | | |
|---|---|---|---|
| 3,978,580 A | 9/1976 | Leupp et al. | 29/886 |
| 4,094,058 A | 6/1978 | Yasutake et al. | 29/592 |
| 4,653,864 A | 3/1987 | Baron et al. | 349/101 |
| 4,691,995 A | 9/1987 | Yamazaki et al. | 349/189 |
| 4,775,225 A | 10/1988 | Tsuboyama et al. | 349/155 |
| 5,263,888 A | 11/1993 | Ishihara et al. | 349/190 |
| 5,269,351 A * | 12/1993 | Yoshihara | 141/7 |
| 5,379,139 A | 1/1995 | Sato et al. | 349/155 |
| 5,406,989 A | 4/1995 | Abe | 141/7 |
| 5,499,128 A | 3/1996 | Hasegawa et al. | 349/155 |
| 5,507,323 A | 4/1996 | Abe | 141/31 |
| 5,539,545 A | 7/1996 | Shimizu et al. | 349/86 |
| 5,548,428 A * | 8/1996 | Masaki et al. | 349/189 |
| 5,548,429 A | 8/1996 | Tsujita | 257/24 |
| 5,568,297 A * | 10/1996 | Tsubota et al. | 156/145 |
| 5,680,189 A | 10/1997 | Shimizu et al. | 349/123 |
| 5,757,451 A | 5/1998 | Miyazaki et al. | 349/106 |
| 5,852,484 A | 12/1998 | Inoue et al. | 349/86 |
| 5,854,664 A | 12/1998 | Inoue et al. | 349/92 |
| 5,861,932 A | 1/1999 | Inata et al. | 349/156 |
| 5,875,922 A | 3/1999 | Chastine et al. | 222/1 |
| 5,952,676 A | 9/1999 | Sato et al. | 257/59 |
| 5,956,112 A | 9/1999 | Fujimori et al. | 349/156 |
| 6,001,203 A | 12/1999 | Yamada et al. | 156/106 |
| 6,016,181 A | 1/2000 | Shimada | 349/156 |
| 6,219,126 B1 | 4/2001 | Von Gutfeld | 349/153 |

(Continued)

FOREIGN PATENT DOCUMENTS

EP     1003066     5/2000

(Continued)

*Primary Examiner*—Tarifur R. Chowdhury
(74) *Attorney, Agent, or Firm*—McKenna Long & Aldridge LLP

(57) ABSTRACT

An apparatus for manufacturing a liquid crystal display device includes a vacuum processing chamber having a substrate entrance, an upper stage and a lower stage provided at an interior of the vacuum processing chamber, and a compensation system positioned within the vacuum processing chamber for compensating for a temperature loss of the vacuum processing chamber when a pressure in the interior of the vacuum processing chamber is reduced.

16 Claims, 16 Drawing Sheets

U.S. PATENT DOCUMENTS

| | | | |
|---|---|---|---|
| 6,236,445 B1 | 5/2001 | Foschaar et al. | 349/156 |
| 6,271,907 B1 * | 8/2001 | Masaki et al. | 349/189 |
| 6,304,311 B1 | 10/2001 | Egami et al. | 349/187 |
| 6,337,730 B1 | 1/2002 | Ozaki et al. | 349/156 |
| 2001/0021000 A1 | 9/2001 | Egami et al. | 349/187 |
| 2002/0008838 A1* | 1/2002 | Matsuda | 349/187 |
| 2003/0063252 A1* | 4/2003 | Kato | 349/190 |

FOREIGN PATENT DOCUMENTS

| | | |
|---|---|---|
| JP | 51-65656 | 6/1976 |
| JP | 52-149725 | 12/1977 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55626 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 | 8/1994 |
| JP | 6-313870 | 8/1994 |
| JP | 6-265915 | 9/1994 |
| JP | 7-84268 | 3/1995 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311310 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-133438 | 12/1998 |
| JP | 11-14953 | 1/1999 |
| JP | 11-38424 | 2/1999 |
| JP | 11-61811 | 3/1999 |
| JP | 11-109388 | 4/1999 |
| JP | 11-142864 | 5/1999 |
| JP | 11-174177 | 7/1999 |
| JP | 11-212045 | 8/1999 |
| JP | 11-248930 | 9/1999 |
| JP | 11-326922 | 10/1999 |
| JP | 11-314714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 8/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-35302 | 6/2000 |

* cited by examiner

BONDING APPARATUS HAVING COMPENSATING SYSTEM FOR LIQUID CRYSTAL DISPLAY DEVICE AND METHOD FOR MANUFACTURING THE SAME

The present invention claims the benefit of Korean Patent Application Nos. 2002-15951 filed in Korea on Mar. 25, 2002, and 2002-13191 filed in Korea on Mar. 12, 2002, which are hereby incorporated by reference.

BACKGROUND OF THE INVENTION

1. Field of the Invention

The present invention relates to a manufacturing apparatus and manufacturing method, and more particularly, to an apparatus and method for manufacturing a liquid crystal display (LCD).

2. Discussion of the Related Art

In response to an increasing demand for displays devices having different operational characteristics, various display devices have been developed including liquid crystal displays (LCD), plasma display panels (PDP), electro-luminescent displays (ELD), and vacuum fluorescent displays (VFD) to replace conventional cathode ray tube (CRT) devices. In particular, LCD devices are commonly used because of their high resolution, light weight, thin profile, and low power consumption. In addition, LCD devices are commonly implemented in mobile display devices, such as monitors for notebook computers, and display monitors for computers and televisions. Accordingly, efforts to improve image quality of LCD devices have directly conflicted with the benefits of their high resolution, light weight, thin profile, and low power consumption. Thus, to incorporate LCD devices as general image display devices, image quality must be maintained.

Methods for manufacturing an LCD device may be divided two different categories: liquid crystal injecting and liquid crystal dropping. The liquid crystal injecting method includes steps of forming a sealant pattern on a first substrate to form an injection inlet, bonding the first to a second substrates in a vacuum state, and injecting liquid crystal material through the injection inlet. The liquid crystal dropping method, which is disclosed in Japanese Patent Application Nos. 11-089612 and 11-172903, includes steps of dropping liquid crystal material on a first substrate, arranging a second substrate over the first substrate, and joining the first and second substrates, thereby bonding the first and second substrates in a vacuum state. Compared to the liquid crystal injection method, the liquid crystal dropping method is advantageous since various steps, such as forming the liquid crystal material injection inlet, injecting the liquid crystal material, and sealing of the injection inlet may be omitted.

FIG. 1A is a cross sectional view of a substrate bonding device during a loading process according to the related art. In FIG. 1A, the substrate bonding includes a frame 10, an upper stage 21, a lower stage 22, a sealant dispenser (not shown), a liquid crystal material dispenser 30, an upper chamber unit 31, a lower chamber unit 32, a chamber moving system, a receiving system, and a stage moving system.

The chamber moving system includes a driving motor 40 driven to selectively move the lower chamber unit 32 to a first location where deposition of the sealant and/or the liquid crystal material occur. The driving motor also is driven to move the lower chamber unit 32 to a second location where the bonding process is performed.

The stage moving system includes another driving motor 50 driven to selectively move the upper stage 21 in a vertical direction. The driving motor moves the upper stage 21 in a downward direction during a bonding process, and moves the upper stage 21 along an upward direction during a loading/unloading process.

The receiving system temporarily receives an upper substrate, which is attached to the upper substrate to the upper stage 21, at both diagonal portions of the upper substrate. The receiving system includes a rotational axis 61, a rotational actuator 63, an elevating actuator 64, and a receiving plate 62.

FIG. 1B is a cross sectional view of the substrate bonding device according to the related art during a bonding process. A process of manufacturing a liquid crystal display device using the substrate bonding device according to the related art will be described with regard to FIG. 1B. In FIG. 1B, a second substrate 52 is loaded and affixed onto the upper stage 21 by a vacuum chuck, and a first substrate 51 is loaded and affixed onto the lower stage 22 by a vacuum chuck. Then, the lower chamber unit 32 having the lower stage 22 is moved from a loading/unloading position to the first location by the chamber moving system 40 for sealant and/or liquid crystal material deposition. Next, the lower chamber unit 32 is moved from the first location to the second location by the chamber moving system 40 in preparation for bonding of the first and second substrates 51 and 52 by the chamber moving system 40 after the sealant and/or liquid crystal material have been deposited onto the first substrate 51 by the liquid crystal dropping dispenser. Thereafter, the upper and lower chamber units 31 and 32 are positioned by the chamber moving system 40 and joined together to form a closed processing chamber. Next, the elevating and rotational actuators 64 and 63 are driven so that the receiving plate 62 is positioned at two edges of the second substrate 52 affixed to the upper stage 21.

FIG. 2 is a perspective view of a receiving system according to the related art. In FIG. 2, the second substrate 52 is allowed to drop onto each of the receiving plates 62 of the receiving system by releasing of the vacuum chuck, and pressure at an interior of the processing chamber is reduced by a vacuum device 70 (in FIG. 1B). When a vacuum state is achieved inside the processing chamber, the second substrate 52 is affixed to the upper stage 21 by an electrostatic force applied to the upper stage 21, and the first substrate 51 is affixed to the lower stage 22 by an electrostatic force applied to the lower stage 22. In addition, the rotational and elevating actuators 63 and 64 (in FIG. 1B) of the receiving system are driven to prevent the receiving plate 62 and the rotational axis 61 from interfering with bonding of the first and second substrates 51 and 52. Finally, the upper stage 21 is moved downward by the stage moving system 50 (in FIG. 1B) while in the vacuum state to closely fasten the second substrate 52 to the first substrate 51.

However, the substrate assembly device according to the related art has the following limitations. Since the interior of the processing chamber is in the vacuum state during bonding of the first and second substrates 51 and 52, a temperature in the interior of the processing chamber abruptly drops and any ambient moisture within the processing chamber condenses upon surfaces within the processing chamber. For these reasons, the liquid crystal material and/or the sealant may peel way from the first substrate 51, resulting in a defective substrate assembly.

SUMMARY OF THE INVENTION

Accordingly, the present invention is directed to a substrate bonding apparatus for a liquid crystal display device that substantially obviates one or more problems due to limitations and disadvantages of the related art.

An object of the present invention is to provide a substrate bonding apparatus using a liquid dropping method that compensates an interior temperature of a processing chamber of the substrate bonding apparatus to prevent condensation of moisture in the processing chamber.

Additional features and advantages of the invention will be set forth in the description which follows, and in part will be apparent from the description, or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, an apparatus for manufacturing a liquid crystal display device includes a vacuum processing chamber having a substrate entrance, an upper stage and a lower stage provided at an interior of the vacuum processing chamber, and a compensation system positioned within the vacuum processing chamber for compensating for a temperature loss of the vacuum processing chamber when a pressure in the interior of the vacuum processing chamber is reduced.

In another aspect, a method for manufacturing a liquid crystal display device includes steps of loading first and second substrates inside a vacuum processing chamber, reducing a pressure in an interior of the vacuum processing chamber, compensating for a temperature change in the vacuum processing chamber, bonding the first and second substrates together, venting the vacuum processing chamber, and unloading the first and second substrates from the interior of the vacuum processing chamber.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1A:
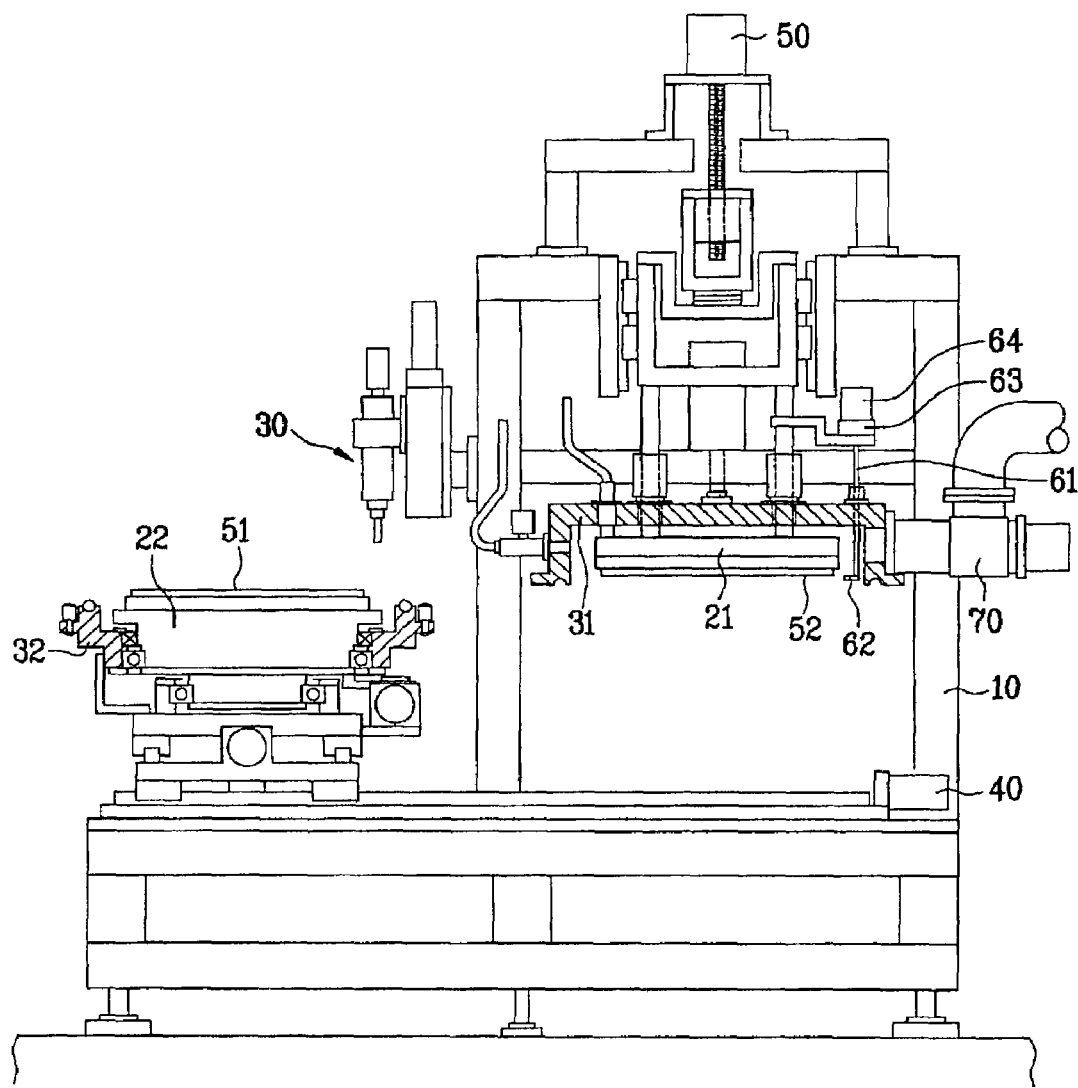
FIG. 1A is a cross sectional view of a substrate bonding device according to the related art during a loading process.
Figure 1B:
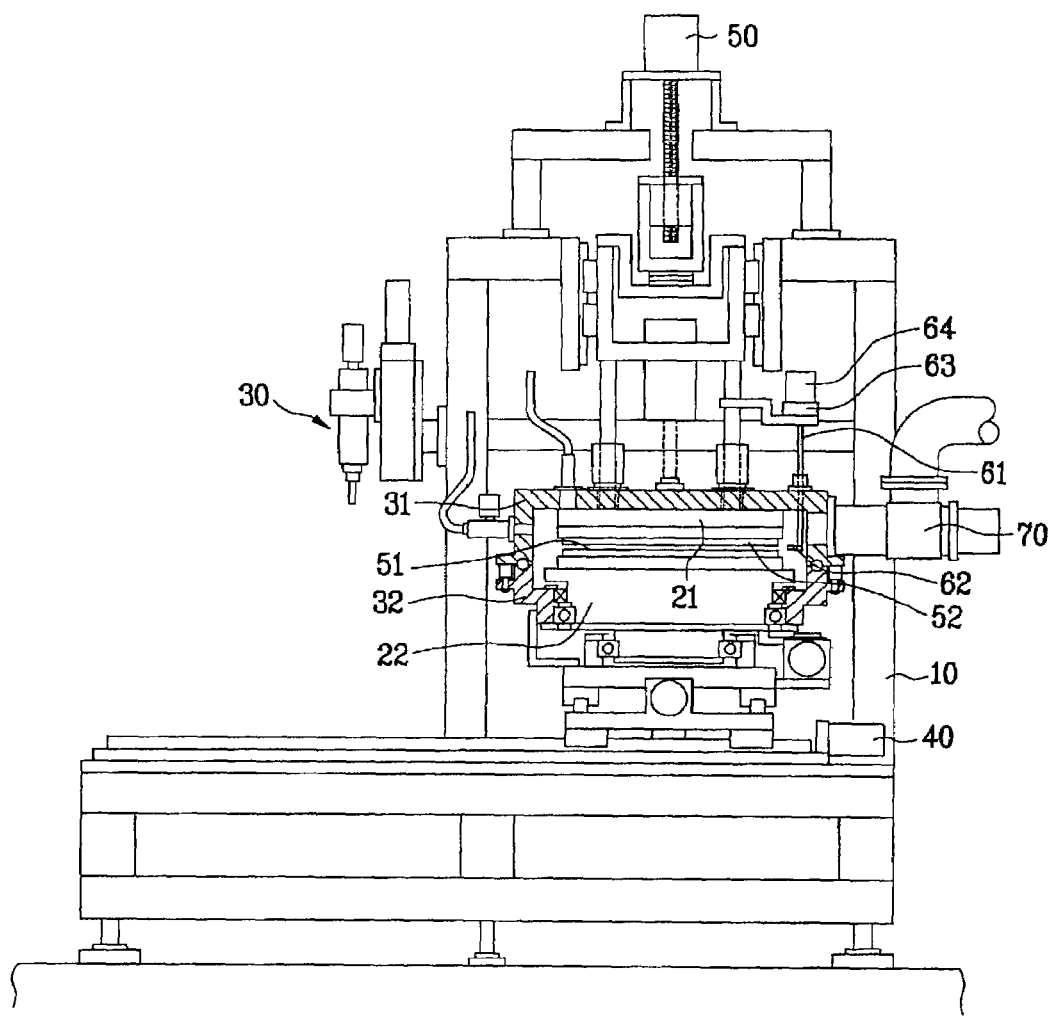
FIG. 1B is a cross sectional view of the substrate bonding device according to the related art during a bonding process.
Figure 2:
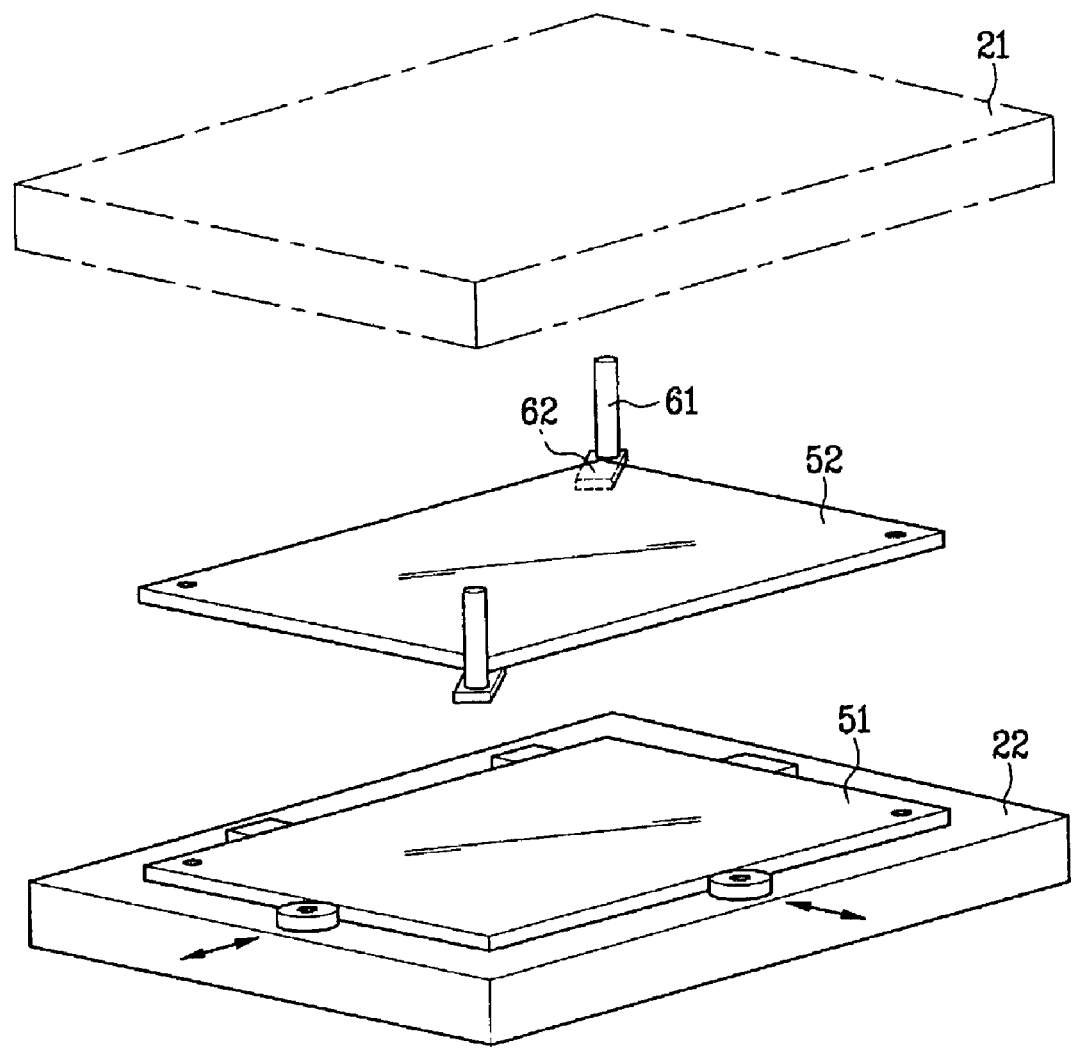
FIG. 2 is a perspective view of a receiving system according to the related art.
Figure 3:
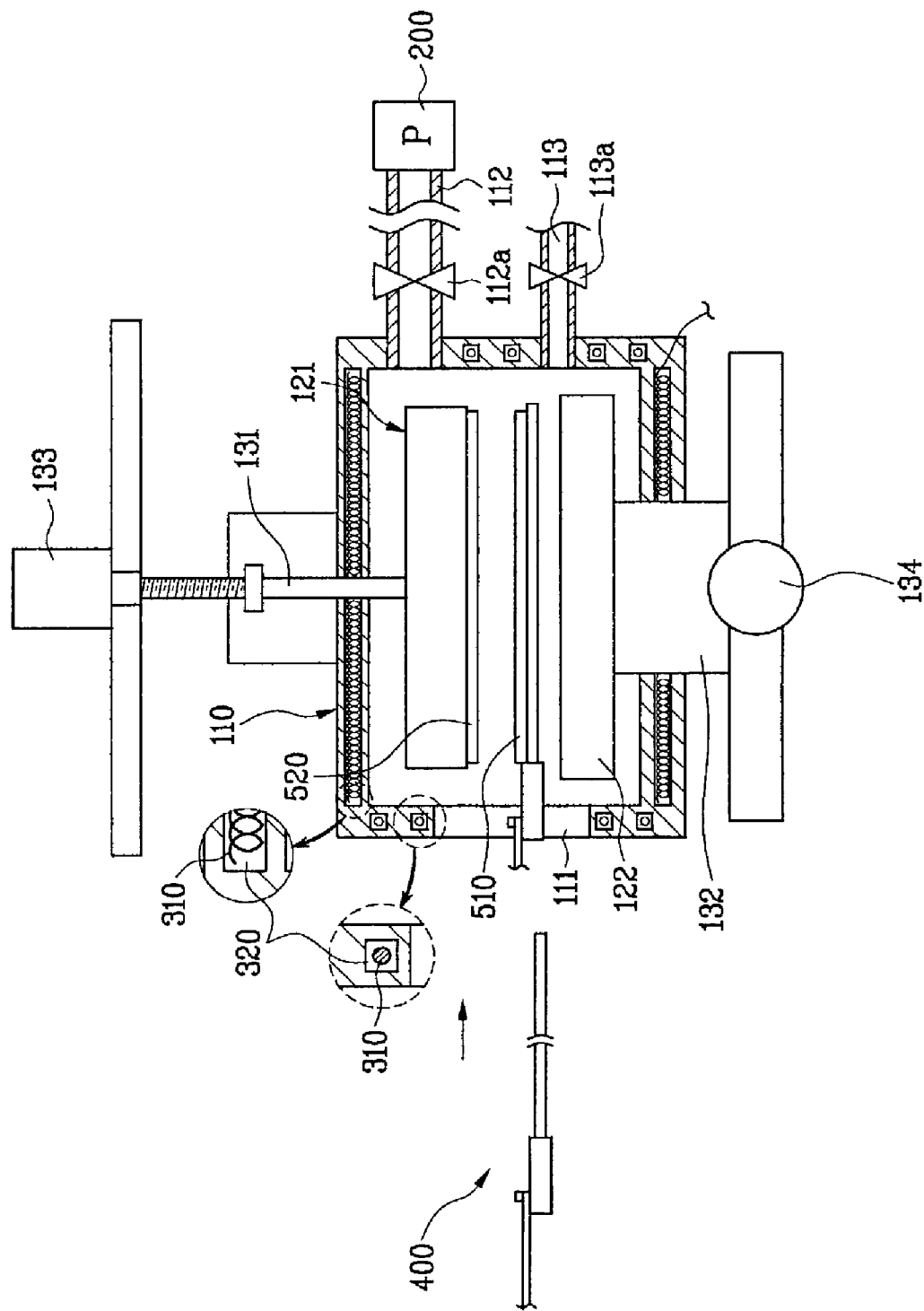
FIG. 3 is a cross sectional view of an exemplary substrate bonding apparatus during a loading process according to the present invention.

FIG. 3 is a cross sectional view of an exemplary substrate bonding apparatus during a loading process according to the present invention. In FIG. 3, the substrate bonding device may include a vacuum processing chamber 110, an upper stage 121, a lower stage 122, a stage moving system, a vacuum device 200, and a temperature compensating system.

In the vacuum processing chamber 110, a process of bonding a first substrate 510 and a second substrate 520 may be performed. The vacuum processing chamber 110 may be formed a single unit. Alternatively, the vacuum processing chamber 110 may be formed of multiple separate units. For example, the vacuum processing chamber 110 may include upper and lower portions, wherein one or both of the upper and lower portions may move along vertical and horizontal directions. The vacuum processing chamber 110 may include an entrance 111 to allow for introduction and extraction of the first and second substrates 510 and 520 by a loading/unloading system 400. In addition, the vacuum processing chamber 110 may include an air outlet pipe 112 and a vent pipe 113. The air outlet pipe 112 may function to remove ambient air from an interior of the vacuum processing chamber 110 by the vacuum device 200, thereby reducing pressure of the interior of the vacuum processing chamber 110. The vent pipe 113 may function to supply the interior of the vacuum processing chamber 110 with air and/or gas in order to return the interior of the vacuum processing chamber 110 to an atmospheric pressure.

The air outlet pipe 112 and the vent pipe 113 may respectively include valves 112a and 113a that may be electronically or manually controlled for selectively opening and closing pathways of the air outlet and vent pipes 112 and 113.

Upper and lower parts of the vacuum processing chamber 110 may include the upper and lower stages 121 and 122. The upper and lower stages 121 and 122 may affix the first and second substrates 510 and 520 brought into a vacuum processing chamber 110 by an loading/unloading system 400. Accordingly, the upper stage 121 may affix the second substrate 520 using one of a vacuum chuck or an electrostatic chuck. Likewise, the lower stage 122 may affix the first substrate 510 using one of a vacuum chuck or an electrostatic chuck. The upper and lower stages 121 and 122 may move along upward and downward directions.

A stage moving system may be coupled to the upper stage 121 and may include a moving axis 131, a rotational axis 132, and a driving motor 133. The moving axis 131 may function to move the upper stage 121 along the upward and downward directions. The rotational axis 132 may function to move the lower stage 122 along the upward and downward directions as well as rotate the lower stage 122 about the upward and downward directions. The driving motor 133 may function to move and/or rotate the respective axes provided to the upper and lower stages 121 and 122.

The temperature compensating system may include heater elements 310 for heating interior and/or exterior wall surfaces of the vacuum processing chamber 110. The temperature compensating system may compensate for any temperature loss of the vacuum processing chamber 110 when the pressure in the interior of the vacuum processing chamber 110 is reduced. The heater elements 310 may be formed to contact the interior and/or the exterior surfaces of the vacuum processing chamber 110, thereby delivering hear to the interior of the vacuum processing chamber 110. Alternatively, the heater elements 310 may be formed only on the interior surface of the vacuum processing chamber 110, thereby preventing any interference with the exterior of the vacuum processing chamber 110. Accordingly, heat delivering pathways 320 may be formed along the interior surfaces of the vacuum processing chamber 110, in which the heater elements 310 are provided.

The heater elements 310 may include a coil, strip, or radiant heaters. In addition, the heat delivering pathways 320 may be formed within sidewalls of the vacuum processing chamber 110, thereby uniformly delivering heat to the interior of the vacuum processing chamber 110. Accordingly, a plurality of heat delivering pathways 320 may be formed within each of the sidewalls of the vacuum processing chamber 110. Alternatively, a single heat delivering pathway 320 may be formed along all of the sidewalls of the vacuum processing chamber 110. Moreover, each of the sidewalls of the vacuum processing chamber 110 may include a single heat delivering pathway 320, or only selected sidewalls may include heat delivering pathways 320. Accordingly, the heat delivering pathways 320 should be configured to deliver an adequate amount of heat to inlet parts of the heater elements 310. Thus, the interior temperature of the vacuum processing chamber 110 should be compensated so as not to drop below 0° C., thereby preventing condensation of the ambient air or moisture within the liquid crystal material.

An exemplary process of bonding substrates using the temperature compensating system according to the present invention will be described with regard to FIG. 3. In FIG. 3, the loading/unloading system 400 may be provided from a previous processing stage with the first substrate 510 and the second substrate 520 for introduction into the vacuum processing chamber 110. The second substrate 520 may be loaded onto the upper stage 121, and the first substrate 510 may be loaded onto the lower stage 122. Both the upper and lower stages 121 and 122 may include a vacuum chuck and an electrostatic chuck for affixing the first and second substrates 510 and 520. Accordingly, the second substrate 520 may be loaded onto the upper stage 121 before loading of the first substrate 510 on the lower stage 122 in order to prevent any contamination from being transferred from the second substrate 520 onto the first substrate 510.

When the loading of the first and second substrates 510 and 520 is completed, the entrance 111 of the vacuum processing chamber 110 may be closed, thereby sealing the interior of the vacuum processing chamber 110.

Figure 4:
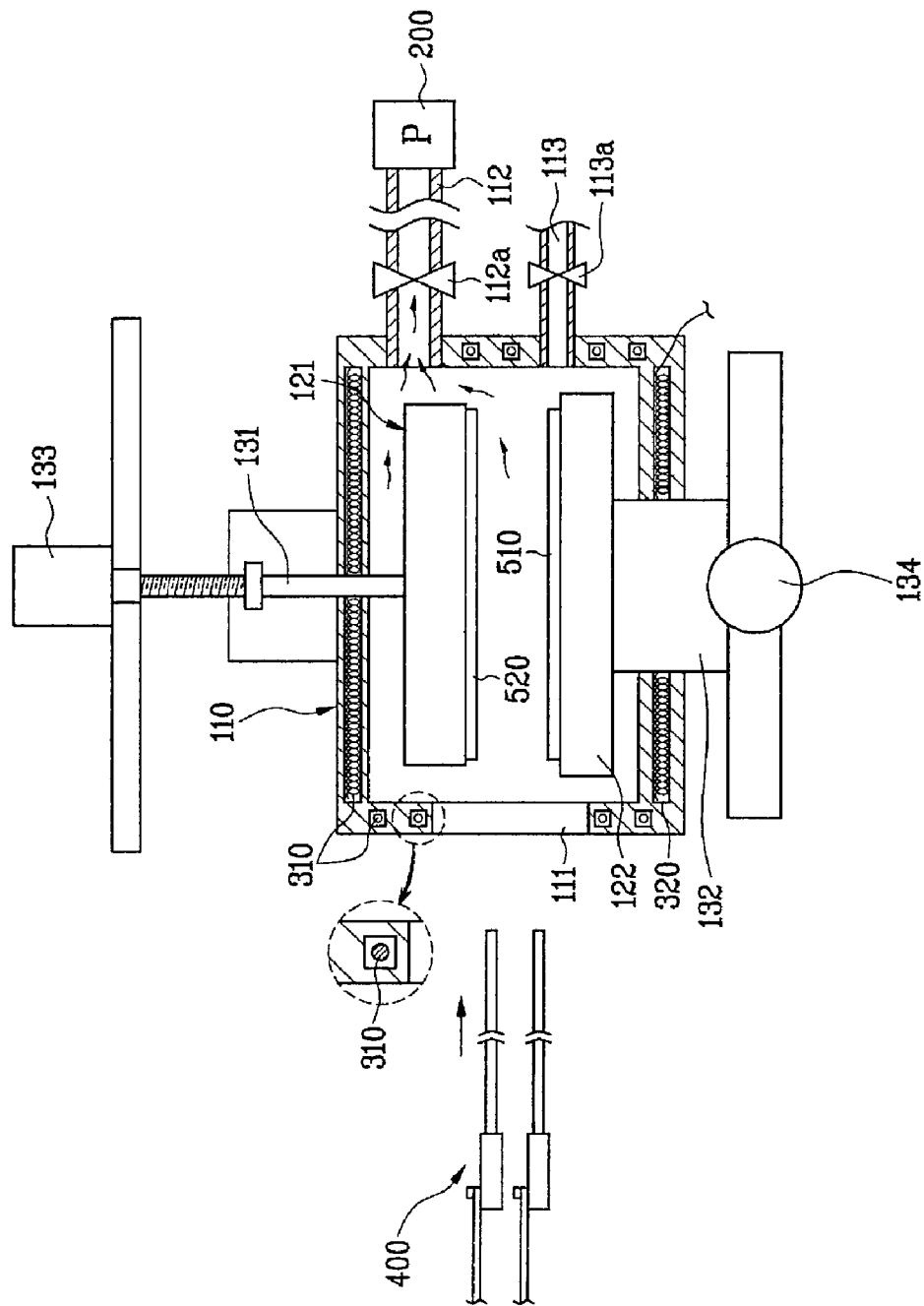
FIG. 4 is a cross sectional view of the exemplary substrate bonding apparatus during a pressure reduction process according to the present invention.

FIG. 4 is a cross sectional view of the exemplary substrate bonding apparatus during a pressure reduction process according to the present invention. In FIG. 4, the vacuum device 200 is enabled to reduce the pressure in the interior of the vacuum processing chamber 110. Alternatively, a plurality of vacuum devices 200 may be used, thereby decreasing a total amount of time to reduce the pressure in the interior of the vacuum processing chamber 110. During the pressure reduction process, the opening/closing valve 112a provided in the air outlet pipe 112 of the vacuum processing chamber 110 keeps the air outlet pipe 112 opened. Accordingly, the reduced pressure generated from the vacuum device 200 is delivered to the interior of the vacuum processing chamber 110 through the air outlet pipe 112, and the interior of the vacuum processing chamber 110 gradually reaches a vacuum state. However, when the vacuum processing chamber 110 reaches the vacuum state, the temperature of the interior of the vacuum processing chamber abruptly drops.

The heater elements 310 of the temperature compensating system are enabled to generate heat, and begin the delivery of heat through each of the heat delivering pathways 320 formed within the sidewalls of the vacuum processing chamber 110. Accordingly, the heat delivered through each of the heat delivering pathways 320 prevents the ambient air and/or moisture within the liquid crystal material from being condensed.

Alternatively, the temperature compensating process of the temperature compensating system may be performed simultaneously with the pressure reduction process of the vacuum processing chamber 110. However, the temperature of the interior of the vacuum processing chamber 110 decreases rapidly as the pressure is reduced. Accordingly, if the pressure reduction process is performed simultaneously with the temperature compensating process, the temperature compensating process may not be adequate to provide enough heat. Therefore, the temperature compensating process of the vacuum processing chamber 110 should be started before the pressure reduction process begins, and should be continued until the vacuum processing chamber 110 reaches more than a desired temperature. Alternatively, the temperature compensating process may be performed when the loading of the substrates is completed or when the interior of the vacuum processing chamber 110 is sealed.

When the pressure in the interior of the vacuum processing chamber 110 has been adequately reduced by the vacuum device 200, the vacuum device 200 is disabled and the opening/closing valve 112a keeps the air outlet pipe 112 closed.

Figure 5:
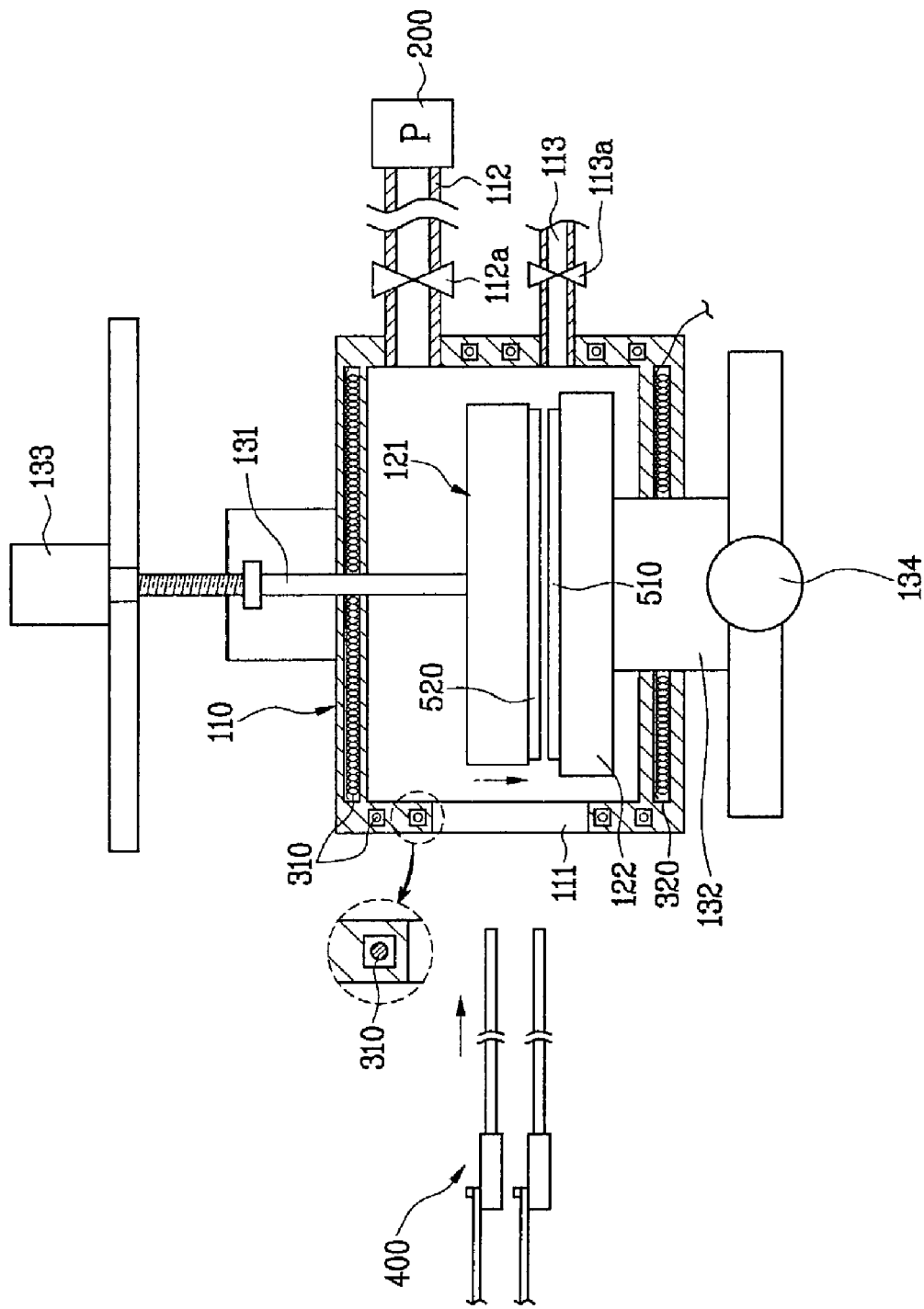
FIG. 5 is a cross sectional view of the exemplary substrate bonding apparatus during a bonding process according to the present invention.

FIG. 5 is a cross sectional view of the exemplary substrate bonding apparatus during a bonding process according to the present invention. In FIG. 5, as the stage moving system is driven, the upper stage 121 is moved along the downward direction toward the lower stage 122, thereby joining and bonding the first and second substrates 510 and 520 together.

Figure 6:
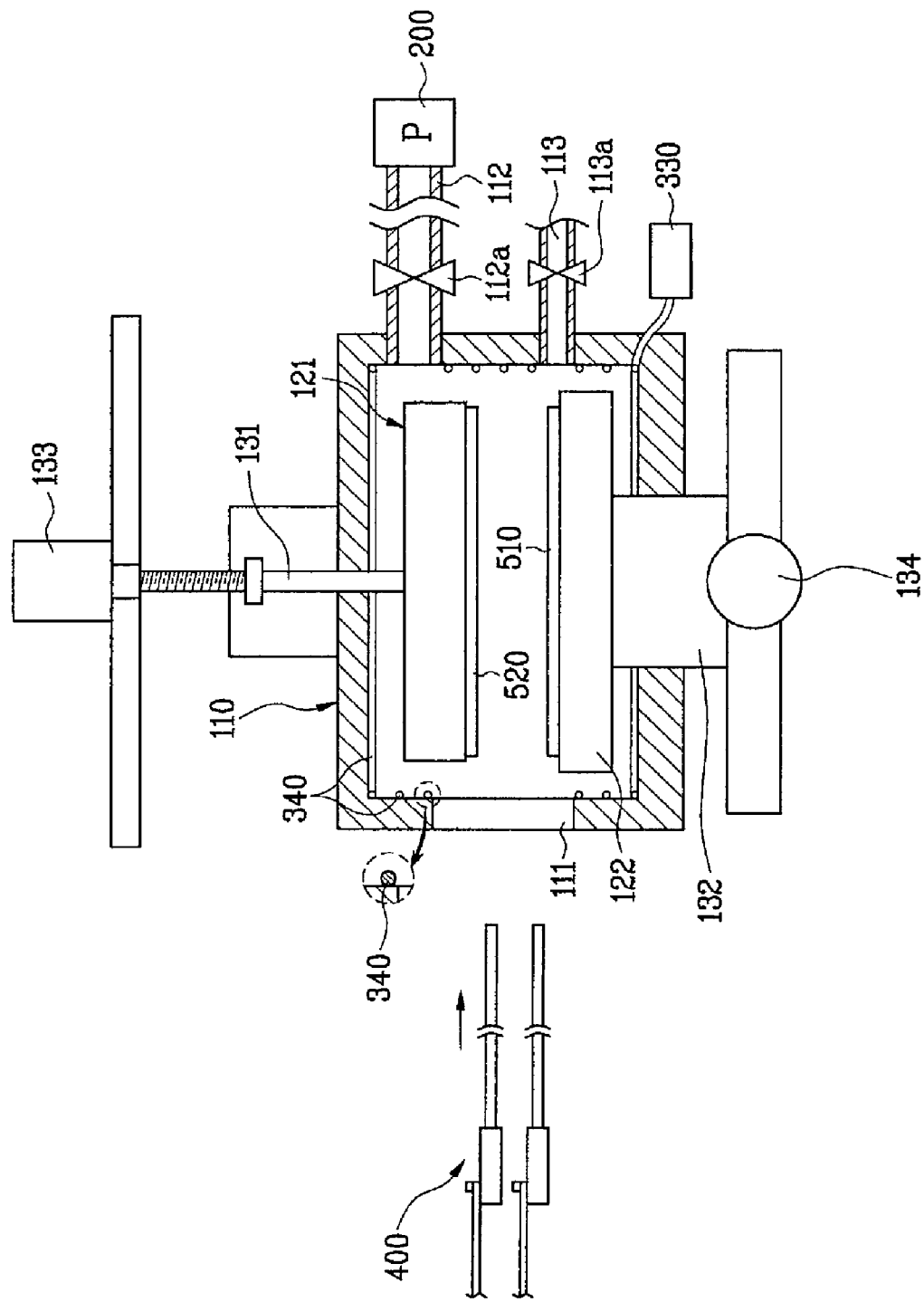
FIG. 6 is a cross sectional view of another exemplary substrate bonding apparatus according to the present invention.

FIG. 6 is a cross sectional view of another exemplary substrate bonding apparatus according to the present invention. In FIG. 6, the substrate bonding device may include a heater element 330 positioned at the exterior of the vacuum processing chamber 110, and a plurality of heating pipes 340 may be formed along the interior sidewalls surfaces of the vacuum processing chamber 110 for delivering the heat generated by the heater 330 to the interior of the vacuum processing chamber 110. Accordingly, and adjoining part of the heating pipes 340 and the vacuum processing chamber 110 should be sealed. The heating pipes 340 may include a material having a high heat conductivity, and may be configured as a solid bar shape and/or a solid plate shape.

Alternatively, the plurality of heating pipes 340 may be formed of individually controlled groups. For example, a first plurality of heating pipes 340 may be formed along top and/or bottom portions of the vacuum processing chamber 110 and may be connected to a first heater 330, and a second plurality of heating pipes 340 may be formed along lateral side portions of the vacuum processing chamber 110 and may be connected to a second heater 330. Moreover, multiple configurations may be possible depending upon a desired amount of temperature compensation of the interior of the vacuum processing chamber 110.

Figure 7:
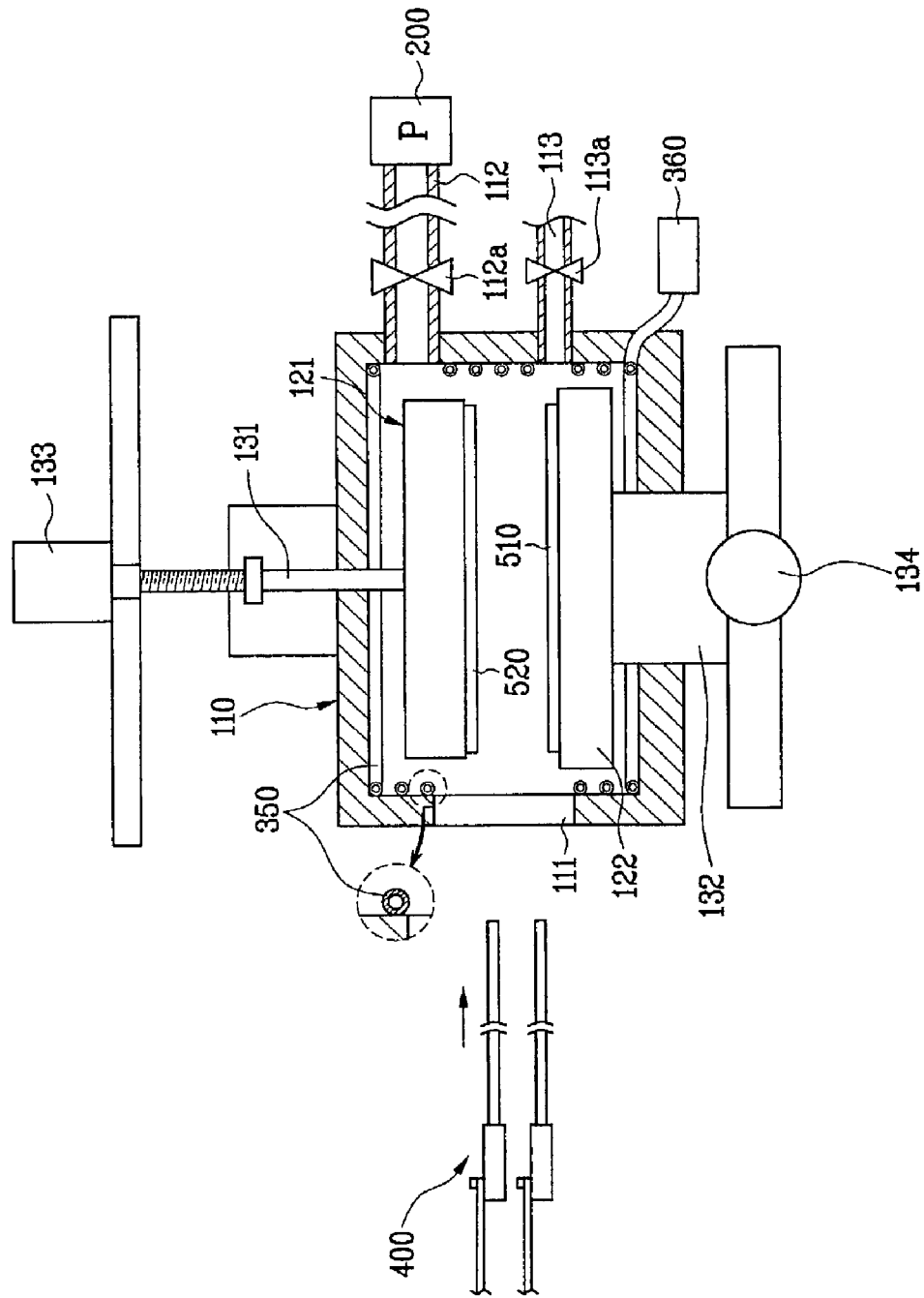
FIG. 7 is a cross sectional view of another exemplary substrate bonding apparatus according to the present invention.

FIG. 7 is a cross sectional view of another exemplary substrate bonding apparatus according to the present invention. In FIG. 7, the substrate bonding device may include a heater 360 positioned at the exterior of the vacuum processing chamber 110, and a plurality of heat delivering pipes 350 may be formed along the interior sidewall surfaces of the vacuum processing chamber 110 and connected to the heater 360. Alternatively, the plurality of heat delivering pipes 350 may be formed of individually controlled groups. For example, a first plurality of heat delivering pipes 350 may be formed along top and/or bottom portions of the vacuum processing chamber 110 and may be connected to a first heater 360, and a second plurality of heat delivering pipes 350 may be formed along lateral side portions of the vacuum processing chamber 110 and may be connected to a second heater 360. Moreover, multiple configurations may be possible depending upon a desired amount of temperature compensation of the interior of the vacuum processing chamber 110.

Figure 8:
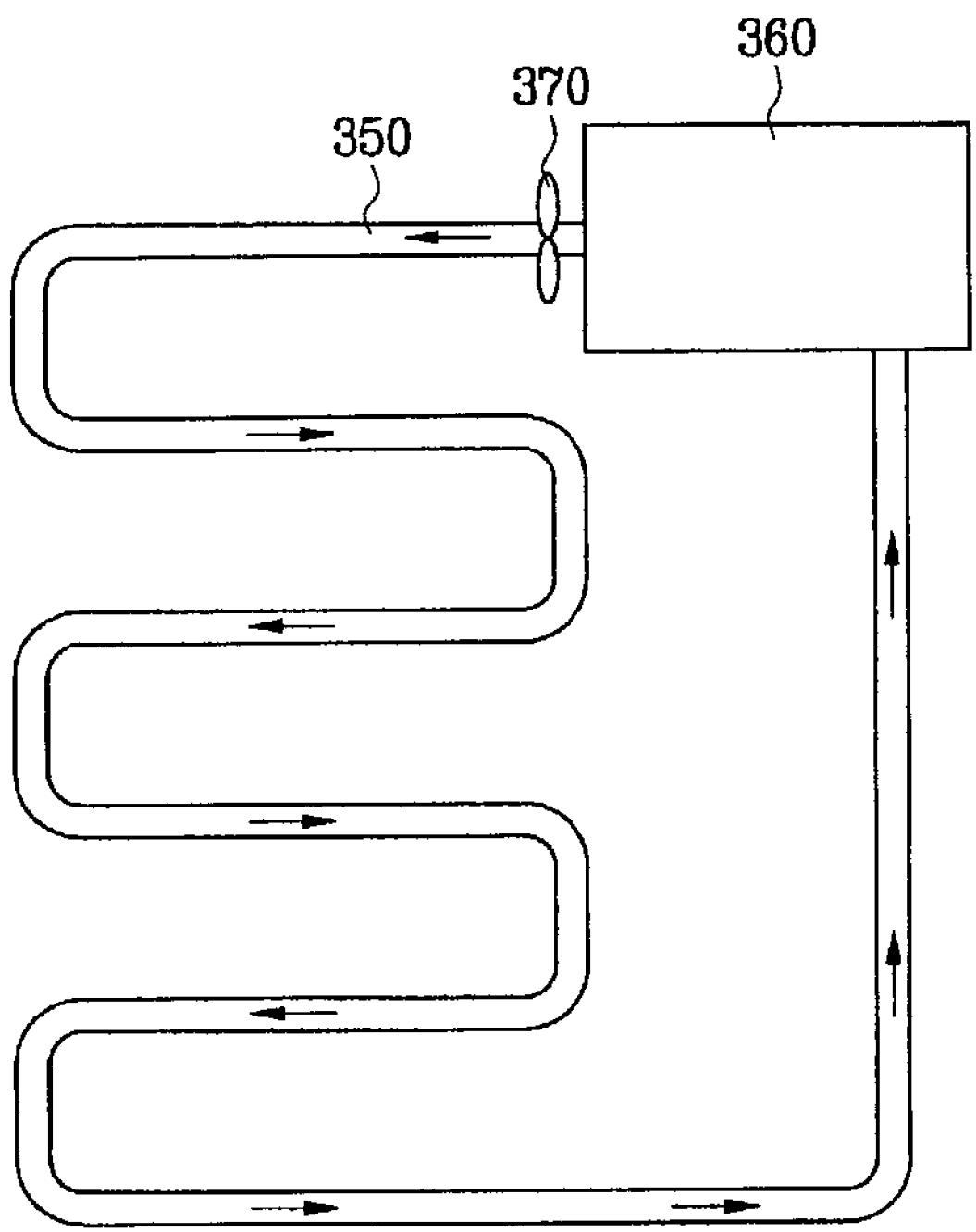
FIG. 8 is a schematic diagram of an exemplary temperature compensating system according to the present invention.

FIG. 8 is a schematic diagram of an exemplary temperature compensating system according to the present invention. In FIG. 8, a rotating fan 370 may be formed to circulate a hot fluid, such as air, gas or a liquid, through the heat delivering pipes 350 from the heater 360. In other words, when the vacuum processing chamber 110 of the present invention reaches a desired vacuum state, the heater 360 may be enabled to heat the circulating fluid circulating through the heat delivering pipes 350. Accordingly, the fluid heated by the heater 360 flows through the heat delivering pipes 350 and is conducted into the interior of the vacuum processing chamber 110. Likewise, the fluid is conducted out of the interior of the vacuum processing chamber 110 and is circulated back into the heater 360 for reheating of the fluid, thereby providing temperature compensation for the vacuum processing chamber 110.

Figure 9:
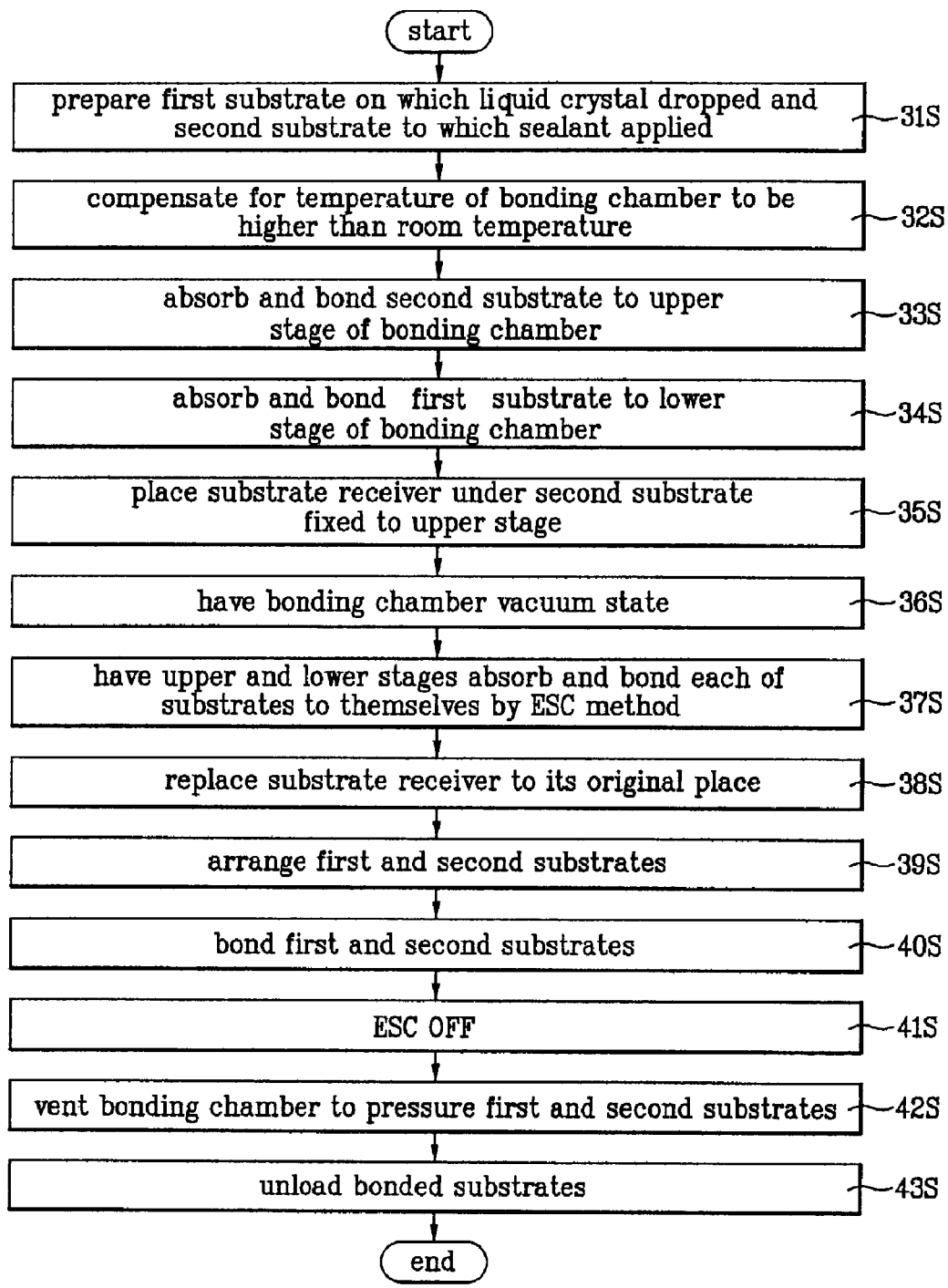
FIG. 9 is a flow chart of an exemplary bonding process of an LCD device according to the present invention.
Figure 10A:
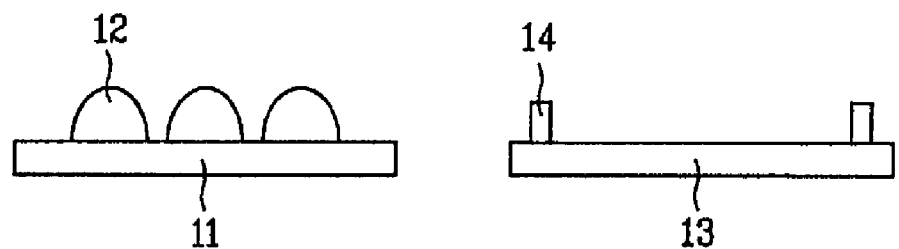
FIGS. 10A to 10J are cross sectional diagrams of an exemplary manufacturing processes of an LCD device based on a liquid crystal dropping method according to the present invention.

FIGS. 9 and 10A to 10J are a flow chart and cross sectional diagrams of an exemplary bonding process of an LCD device according to the present invention. In FIGS. 9 and 10A, a step 31S may include providing a first substrate 11 having a liquid crystal material 12 deposited thereon, and a second substrate 13 have a sealant 14 deposited thereon. Alternatively, the first substrate 11 may have both the liquid crystal material 12 and the sealant 14 deposited thereon, and the second substrate 13 may not have either of the liquid crystal material 12 and the sealant 14 deposited thereon. The first and second substrates 11 and 13 may include a thin film transistor substrate and/or a color filter substrate. The second substrate 13 may be cleaned via an ultrasonic cleaner (USC) prior to deposition of the sealant 14, thereby removing contaminate particles that may otherwise interfere with bonding of the sealant 14. Likewise, the first substrate 11 may be cleaned using the USC prior to deposition of the liquid crystal material 12.

Figure 10B:
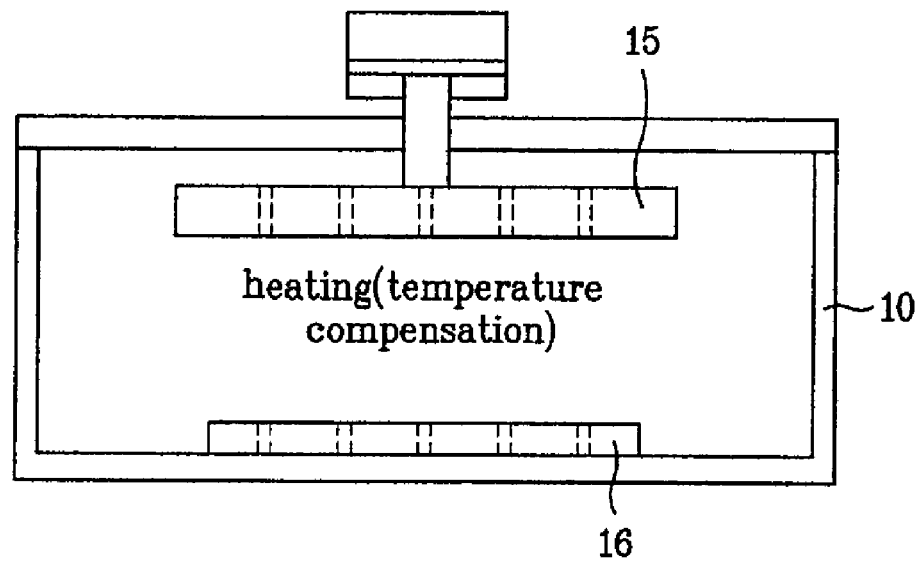

In FIGS. 9 and 10B, a step 32S may include enabling a temperature compensating system at the interior of the vacuum processing chamber 10 to compensate for a reduction of temperature of the interior of the vacuum processing chamber 10. Accordingly, although the vacuum processing chamber 10 maintains an ambient room temperature of about 23° C.~25° C. at both an atmospheric state and a loading state, the temperature of the vacuum processing chamber 10 rapidly drops when the vacuum processing chamber 10 reaches a desired vacuum state. When the temperature of the vacuum processing chamber is below 0° C., any moisture of the ambient air or gases of the vacuum processing chamber 10 or any moisture contained in the liquid crystal material 12 (in FIG. 10A) may be condensed. Accordingly, as shown in FIG. 10B, at the same time as or before loading of the first and second substrates 11 and 13 (in FIG. 10A) begins, compensation of the interior temperature of the vacuum processing chamber 10 may be enabled.

An exemplary timing sequence for the temperature compensating process may begin during the loading of the first and second substrates 11 and 13 (in FIG. 10A). In addition, to maximize loading efficiency, the temperature compensating process can be started after the loading process is completed and before a pressure reduction process is started. Here, the temperature may be more easily compensated when a loading/unloading entrance of the vacuum processing chamber 10 is closed. Moreover, to save overall processing time, the temperature compensating process can be started at the same time as or after the pressure reduction process is started. The temperature of the vacuum processing chamber may be compensated so as not to be dropped to or less than 0° C. Specifically, the interior temperature of the vacuum processing chamber 10 should be compensated to be at least 5° C. higher than an ambient temperature of the exterior of the vacuum processing chamber 10. In addition, when considering possible different temperatures in different places in the interior of the vacuum processing chamber 10, the temperature may be compensated to be higher than 35° C.–45° C.

Figure 10C:
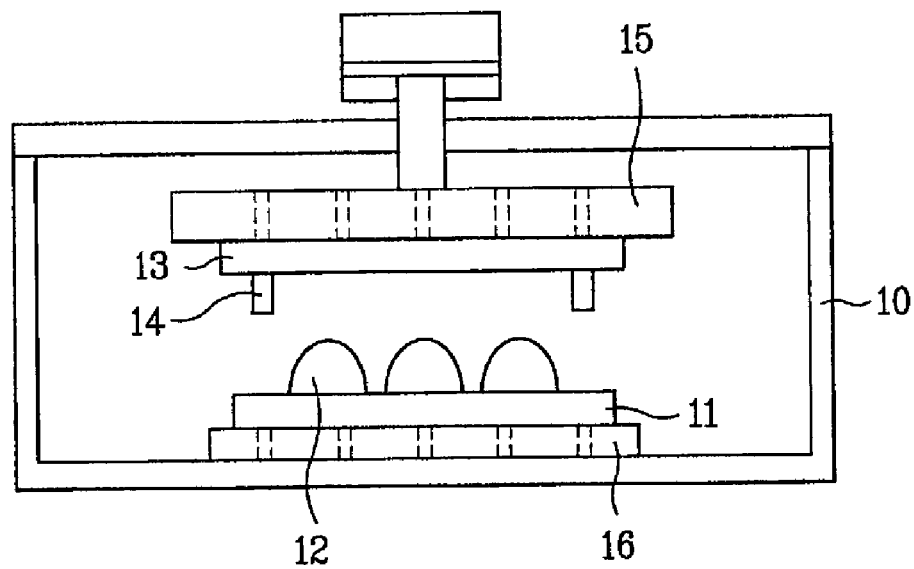

In FIGS. 9 and 10C, a step 33S may include affixing a first surface of the second substrate 13 to an upper stage 15 of the vacuum processing chamber 10 by an electrostatic chuck such that as second surface of the second substrate 13, which has the sealant 14 applied thereto, facing down toward a lower stage 16. Then, a step 34S may include affixing a first surface of a first substrate 11, which has a second surface having the liquid crystal 12, onto the lower stage 16 by another electrostatic chuck. During both steps 33S and 34S, the vacuum processing chamber 10 may be maintained at the atmospheric state.

Specifically, steps 33S and 34S may include a loading/unloading system (not shown) that introduces the second substrate 13 to the interior of the vacuum processing chamber 10. Then, the upper stage 13 travels along a downward direction toward the lower stage 16 to affix the second substrate 13 to the upper stage 15 by the electrostatic chuck. After affixing the second substrate 13, the upper stage 15 travels along an upward direction away from the lower stage 16. In addition, a vacuum chuck may be used instead of the electrostatic chuck. The loading/unloading system exits the vacuum processing chamber 10 and places the first substrate 11 on an upper side of the lower stage 16 in the vacuum processing chamber 10.

In FIG. 9, a step 35S may include the loading/unloading system placing a substrate receiver (not shown) of the vacuum processing chamber 10 under the second substrate 13 that is affixed to the upper stage 15. The substrate receiver may be placed under the second substrate 13 since magnitude of the vacuum pressure at the interior of inside the vacuum processing chamber may be higher than a magnitude of the vacuum pressure of the vacuum chucks of the upper and lower stages. In other words, since the vacuum chucks of the upper and lower stages 15 and 16 operate using a relatively lower degree of vacuum pressure and as the vacuum processing chamber reaches the desired vacuum state, the first and second substrates 11 and 13 will become dislodged from the upper and lower stages 15 and 16. Thus, the substrate receiver may be placed under the second substrate 13 to prevent the second substrate from being detached from the upper stage and dropped onto the first substrate 11. Then, the second substrate 13 may be later re-affixed to the upper stage 15 using an electrostatic chuck. Likewise, the first substrate 11 may be later re-affixed to the lower stage using an electrostatic chuck.

Figure 10D:
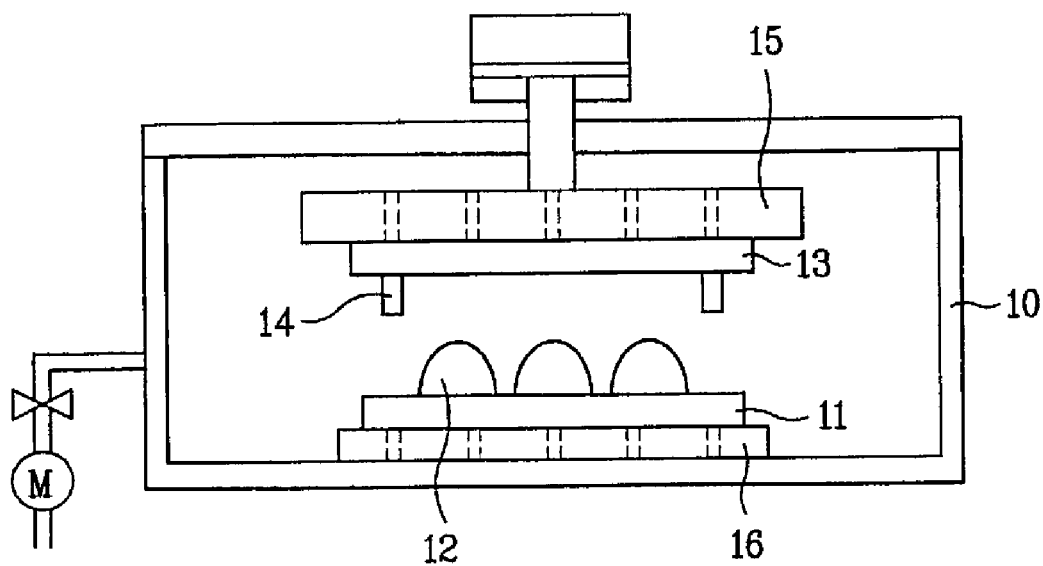

In FIGS. 9 and 10D, a step 36S may include closing the chamber entrance (not shown) of the vacuum processing chamber 10, thereby sealing the vacuum processing chamber 10. Then, a vacuum pump may be enabled to reduce the pressure in the interior of the vacuum processing chamber 10. The degree of vacuum pressure of the vacuum processing chamber 10 may be different according to a desired mode of operation of the liquid crystal display device. In the IPS mode, the degree of vacuum pressure may be from about $1.0 \times 10^{-3}$ Pa to about 1 Pa. In the TN mode, the degree of vacuum pressure may be from about $1.1 \times 10^{-3}$ Pa to about $10^2$ Pa.

Figure 10E:
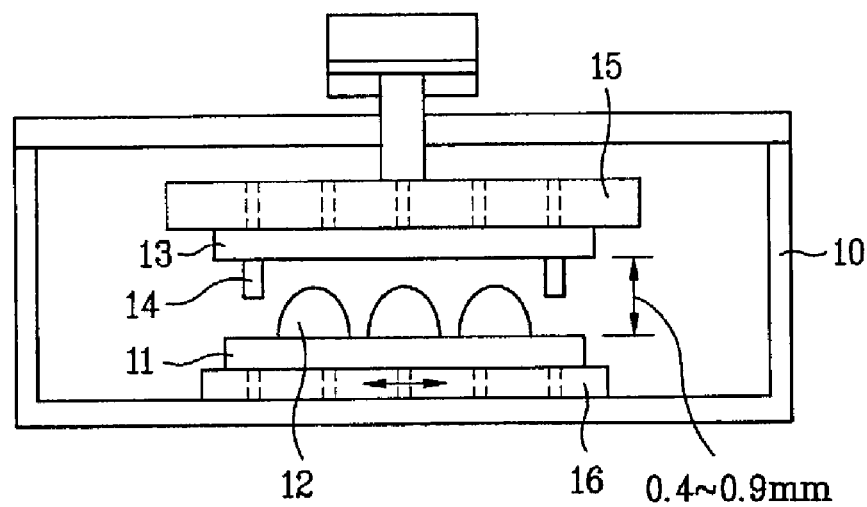

In FIGS. 9 and 10E, a step 37S may include re-affixing the second substrate 13 to the upper stage 15 using the electrostatic chuck, and re-affixing the first substrate 11 to the lower stage 16 using the electrostatic chuck. A step 38S may include returning the substrate receiver to its original position. In the electrostatic chucks, at least two flat electrodes may be provided within each of the upper and lower stages 15 and 16. Accordingly, anode/cathode direct current power may be applied to each of the flat electrodes, and anode or cathode charges flow to the stage. Thus, an electric conduction layer (i.e., a transparent layer such as a common electrode or a pixel electrode) formed on the first and second substrates 11 and 13 provide a necessary coulomb force between the electric conduction layer and the electrodes. For example, if one of the substrate surfaces having the electric conduction layer is placed to face one of the stages, a voltage of about 0.1 to 1KV is applied to the electrodes. Likewise, if another surface of one of the substrates without the electric conduction layer is placed to face one of the stages, a voltage of about 3 to 4 KV is applied to the electrodes. In order to prevent scratching of the substrates, an elastic sheet can be formed on the stages.

Figure 10F:
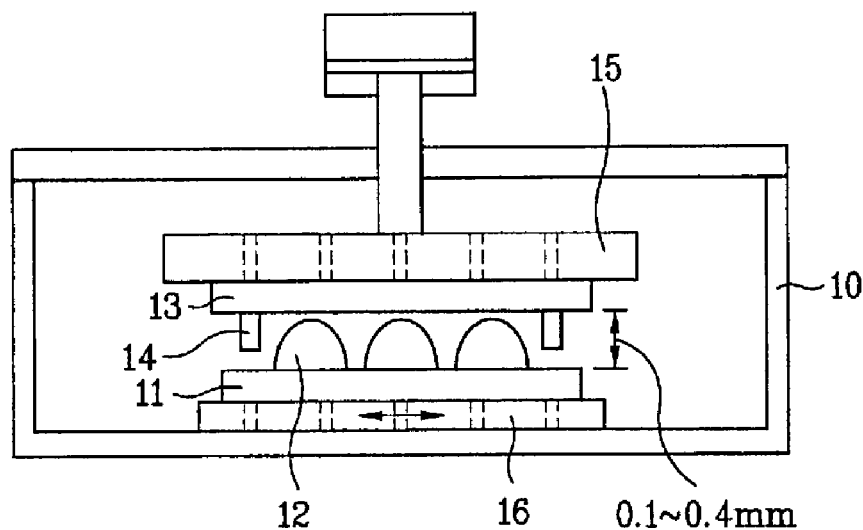

In FIGS. 9, 10E, and 10F, a step 39S may include aligning the first and second substrates 11 and 13 along a horizontal direction. Specifically, the upper stage 15 is lowered along the downward direction until a first interval of about 0.4 mm~0.9 mm between the first and second substrates 11 and 13 is maintained. Then, a first alignment check may be performed using a first set of alignment marks positioned on both the first and second substrates 11 and 13. Accordingly, alignment of the first and second substrates 11 and 13 may be performed using the stage moving system, as shown in FIG. 3, for the upper stage 15, and/or the rotational axis 132, as shown in FIG. 3, for the lower stage 16. Next, as shown in FIG. 10F, the upper stage 15 may travel along the downward direction until a second interval of about 0.1 mm~0.4 mm between the first and second substrates 11 and 13 is maintained. Then, a second alignment check may be performed using a second set of alignment marks positioned on both the first and second substrates 11 and 13. Alternatively, the first set of alignment marks instead of, or in addition to the second set of alignment marks may be used during the second alignment check. Accordingly, further alignment of the first and second substrates 11 and 13 may be performed using the stage moving system, as shown in FIG. 3, for the upper stage 15, and/or the rotational axis 132, as shown in FIG. 3, for the lower stage 16. Thus, the first and second substrates 11 and 13 are aligned.

Figure 10G:
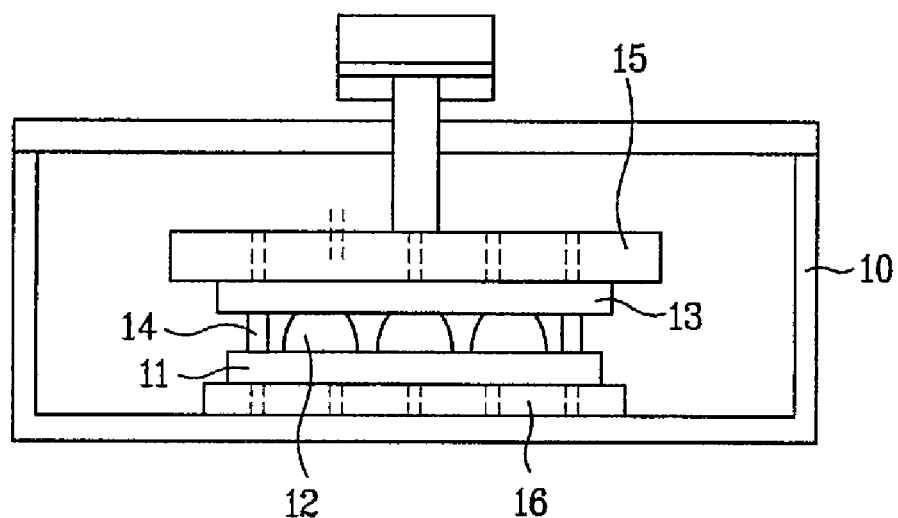
Figure 10H:
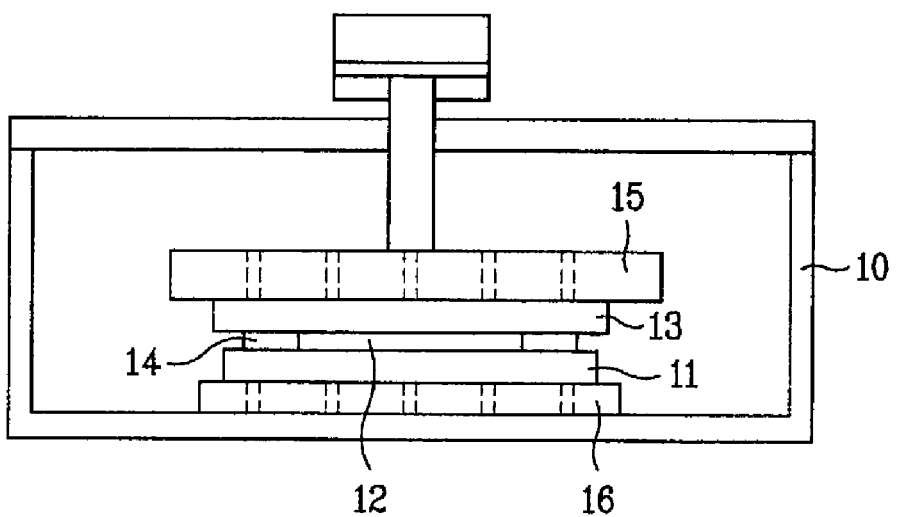

In FIGS. 9, 10G, and 10H, a step of 40S may include the upper stage 15 traveling along the downward direction to join the first and second substrates 11 and 13. Then, the upper stage 15 and/or the lower stage 16 travels to further bond the first and second substrates 11 and 13 together. The speed at which the upper and/or lower stages 15 and 16 move, and the resulting degree of applied pressure may be different. For example, a first point of time may be defined when the second substrate 13 contacts the liquid crystal material 12 of the first substrate 11, or when the first substrate 11 contacts the sealant 14 of the second substrate. Then, after the first point of time until a final pressure time, the applied pressure increases by stages incrementally. For example, the first and second substrates 11 and 13 may be bonded together by about 0.1 tons of pressure during the first point of time. Next, the first and second substrates 11 and 13 may be bonded together by about 0.3 tons of pressure at a second point of time. Then, the first and second substrates 11 and 13 may be bonded together by about 0.4 tons of pressure at a third point of time. Finally, the first and second substrates 11 and 13 may be bonded together by about 0.5 tons of pressure at a fourth point of time, as shown in FIG. 10H. The pressure is applied such that air or gases do not flow into the interval of the two bonded substrates.

Figure 10I:
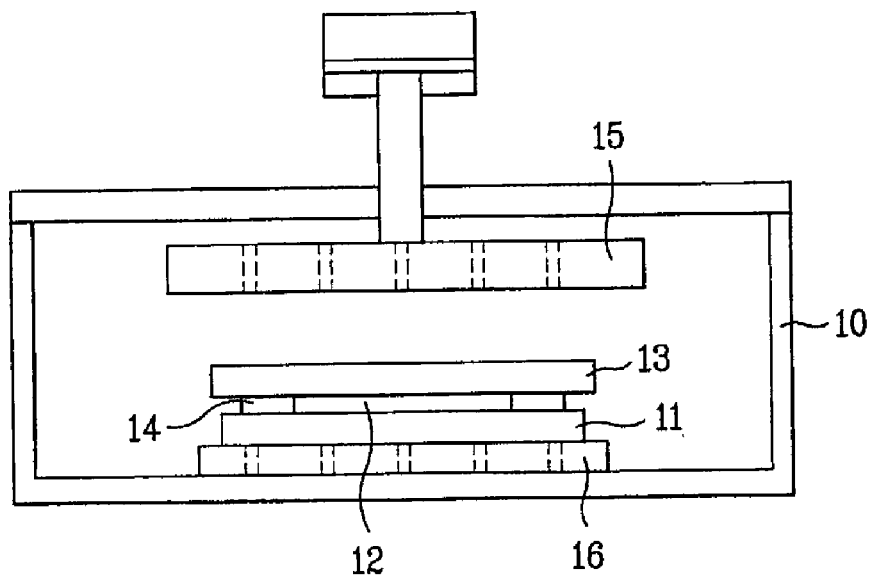

In FIGS. 9 and 10I, a step 41S may include stopping the bonding process when the first and second substrates are completely bonded. Next, the electrostatic chuck of both the upper and lower stages 15 and 16 are disabled, thereby releasing the bonded substrates. Then, the upper stage 15 is moved along the upward direction.

Figure 10J:
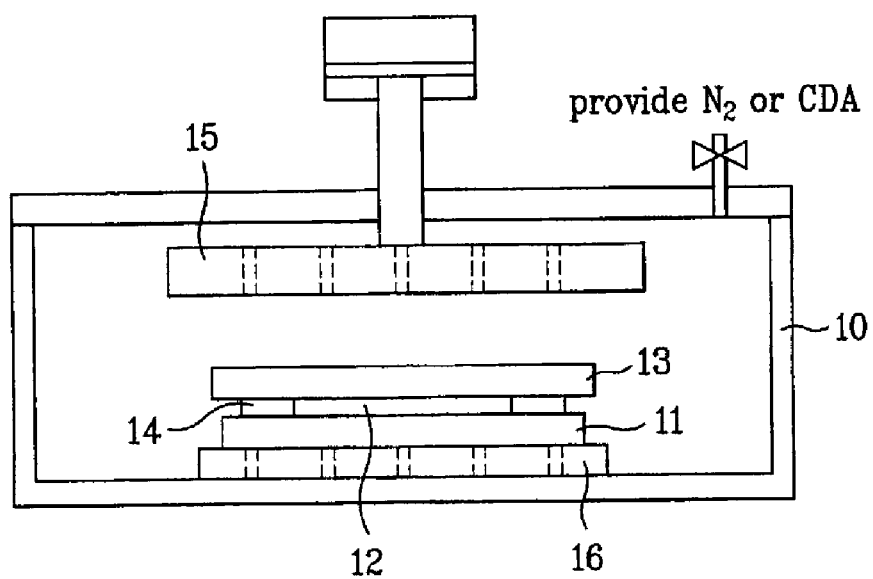
Figure 11:
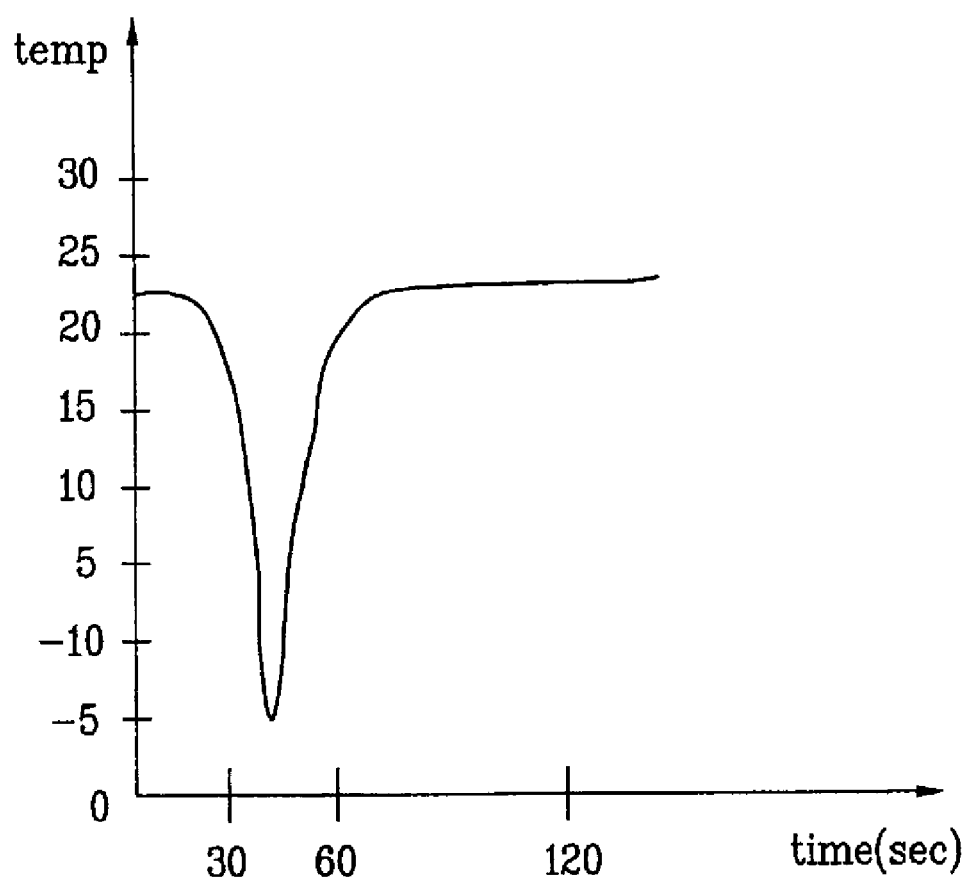
FIG. 11 is a graph of temperature change versus time during pressure reduction of a vacuum processing chamber according to the present invention.

In FIGS. 9 and 10J, a step 42S may include venting the vacuum processing chamber 10 to supply nitrogen gas and dry air into the interior of the vacuum processing chamber 10, therey restoring the pressure of the interior of the vacuum processing chamber 10 to an atmospheric state. Accordingly, the bonded first and second substrates 11 and 13 are pressured by a constant degree of pressure so that the substrates maintain an even interval therebetween.

During the step 42S, the two substrates are evenly pressured, and the sealant disposed between the bonded first and second substrates 11 and 13 is formed with a constant height and thickness. In addition, the resulting interval between the bonded substrates may be 5 mm or less. Specifically, during the bonding process in the interior of the vacuum processing chamber 10, if the sealant is formed to a height range of about 35~45 μm, the interval between the substrates may be within the range of 25~35 μm. Then, when the venting process is performed, the interval between the bonded substrates wherein the sealant is disposed is reduced to about 6 μm or less, and the interval wherein the liquid crystal material is disposed is about 5 μm or less.

In FIGS. 9 and 10J, a step 43S may include unloading the bonded substrates. Specifically, when the interior pressure of the vacuum processing chamber 10 has reached the atmospheric state, the bonded substrates 11 and 13 may be removed from the vacuum processing chamber 10 by the loading/unloading system (not shown). Alternatively, the bonded substrates 11 and 13 may be affixed to the upper stage 15 via the vacuum chuck or the electrostatis chuck, and may travel along the upward direction. Then, the loading/unloading system may be position beneath the upper stage 15, and the bonded substrates 11 and 13 may be lowered onto the loading/unloading system from the upper stage 15. Finally, the vacuum chuck or the electrostatic chuck may be disabled, and the bonded substrates 11 and 13 transferred onto the loading/unloading system and removed from the interior of the vacuum processing chamber 10.

In order to reduce an overall processing time, one of the following methods may be applied. First, during a subsequent bonding process of new first and new second substrates, the new second substrate may be placed onto the upper stage 15 by the loading/unloading system and affixed to the upper stage 15 by the vacuum chuck. Then, the bonded substrates that remain on the lower stage 16 may be unloaded. Alternatively, the upper stage 15 may travel along the upward direction with the bonded substrates 11 and 13 affixed via the vacuum chuck, and a new first substrate 11 may be loaded onto the lower stage 16. Then, and the upper stage 15 may be moved along the downward direction, and the bonded substrates 11 and 13 may be transferred onto the loading/unloading system.

The temperature compensating system may be enabled at the same time as or prior to the loading process, and stopped before the venting process is started. Accordingly, the vacuum processing chamber 10 may be heated to a temperature of about 5° C. higher than the ambient room temperature, which may be about 23~25° C.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for bonding a first substrate and a second substrate for a liquid crystal display device, comprising:
   a vacuum processing chamber having a substrate entrance;
   an upper stage and a lower stage provided at an interior of the vacuum processing chamber, the upper stage affixing the first substrate of the liquid crystal display device and the lower stage affixing the second substrate of the liquid crystal display device, the second substrate having a liquid crystal layer thereof; and
   a compensation system positioned within the vacuum processing chamber for compensating for a temperature loss of the vacuum processing chamber when a pressure in the interior of the vacuum processing chamber is reduced, wherein the compensation system includes at least one heat system for heating outer surfaces of an exterior of the vacuum processing chamber.

2. The apparatus according to claim 1, wherein the heating system is provided on the outer surfaces of the exterior of the vacuum processing chamber.

3. The apparatus according to claim 1, wherein the heating system includes coil heaters.

4. An apparatus for bonding a first substrate and a second substrate for a liquid crystal display device, comprising:
   a vacuum processing chamber having a substrate entrance;
   an upper stage and a lower stage provided at an interior of the vacuum processing chamber, the upper stage affixing the first substrate of the liquid crystal display device and the lower stage affixing the second substrate of the liquid crystal display device, the second substrate having a liquid crystal layer thereof; and
   a compensation system positioned within the vacuum processing chamber for compensating for a temperature loss of the vacuum processing chamber when a pressure in the interior of the vacuum processing chamber is reduced, wherein the compensation systems includes external heaters, and heating pipes formed along inner surfaces of the interior of the vacuum processing chamber.

5. An apparatus for bonding a first substrate and a second substrate for a liquid crystal display device, comprising:
   a vacuum Processing chamber having a substrate entrance;
   an upper stage and a lower stage provided at an interior of the vacuum processing chamber, the upper stage affixing the first substrate of the liquid crystal display device and the lower stage affixing the second substrate of the liquid crystal display device, the second substrate having a liquid crystal layer thereof; and
   a compensation system positioned within the vacuum processing chamber for compensating for a temperature loss of the vacuum processing chamber when a pressure in the interior of the vacuum processing chamber is reduced, wherein the compensation system includes heaters for heating a fluid, and a plurality of heat delivering pipes being formed along within sidewalls of the vacuum processing chamber.

6. A method for manufacturing a liquid crystal display device, comprising the steps of:
   loading first and second substrates inside a vacuum processing chamber having an entrance;
   closing the entrance of the vacuum processing chamber;
   reducing a pressure in an interior of the vacuum processing chamber;
   compensating for a temperature change in the vacuum processing chamber; bonding the first and second substrates together;
   venting the vacuum processing chamber; and
   unloading the first and second substrates from the interior of the vacuum processing chamber.

7. The method according to claim 6, wherein the step of loading includes absorbing the second substrate onto an upper stage and absorbing the first substrate onto a lower stage within the vacuum processing chamber, placing a substrate receiver into the interior of the vacuum processing chamber and under the second substrate absorbed onto the upper stage, affixing the second substrate onto the upper stage by a first electrostatic chuck, and affixing the first substrate by a second electrostatic chuck.

8. The method according to claim 6, wherein the step of compensating is performed after the step of loading and before the step of reducing a pressure.

9. The method according to claim 6, wherein the step of compensating is performed at a same time as the step of reducing a pressure.

10. The method according to claim 6, wherein the step of reducing a pressure is performed more than once.

11. The method according to claim 6, wherein the step of reducing a pressure includes steps of:
    absorbing and affixing the first substrate onto the lower stage; absorbing and affixing the second substrate onto the upper stage;
    reducing the pressure of the interior of the vacuum processing chamber for a first time;

placing the substrate receiver under the second substrate absorbed onto the upper stage, and reducing the pressure of the vacuum processing chamber for a second time.

12. The method according to claim 6, further including a step of aligning the first and second substrates after the step of reducing a pressure and before the step of bonding.

13. The method according to claim 6, wherein the step of compensating for a temperature change includes increasing a temperature of the interior of the vacuum processing chamber to more than about 5' C. above room temperature.

14. The method according to claim 6, wherein, the step of compensating includes increasing a temperature of the interior of the vacuum processing chamber to more than about 35° C.

15. The method according to claim 6, wherein the step of compensating includes increasing a temperature of the interior of the vacuum processing chamber to more than about 45° C.

16. The method according to claim 6, wherein the step of compensating includes maintaining a temperature of the interior of the vacuum processing chamber at greater than 0° C.

* * * * *